United States Patent
Basha et al.

(10) Patent No.: US 10,516,597 B2
(45) Date of Patent: Dec. 24, 2019

(54) SELECTIVE DATA TRANSMISSION IN NETWORKS (71) Applicant: Avaya Inc., Santa Clara, CA (US)

(72) Inventors: Farook Basha, Anantapur (IN); Deepak Ramesh, Bangalore (IN)

(73) Assignee: Avaya Inc., Santa Clara, CA (US)

( * ) Notice: Subject to any disclaimer, the term of this patent is extended or adjusted under 35 U.S.C. 154(b) by 158 days.

(21) Appl. No.: 15/607,701

(22) Filed: May 30, 2017

(65) Prior Publication Data

US 2018/0351848 A1  Dec. 6, 2018
US 2019/0245773 A9  Aug. 8, 2019

(51) Int. Cl.
*H04L 12/721* (2013.01)
*H04L 12/741* (2013.01)
*H04L 12/823* (2013.01)
*H04L 12/813* (2013.01)
*H04L 29/12* (2006.01)
*H04W 72/04* (2009.01)

(52) U.S. Cl.
CPC .............. *H04L 45/12* (2013.01); *H04L 45/74* (2013.01); *H04L 47/20* (2013.01); *H04L 47/32* (2013.01); *H04L 61/2007* (2013.01); *H04W 72/04* (2013.01)

(58) Field of Classification Search
None
See application file for complete search history.

(56) References Cited

U.S. PATENT DOCUMENTS

| 2014/0219105 | A1* | 8/2014 | Sathappan | H04L 12/18 370/238 |
| 2015/0207724 | A1* | 7/2015 | Choudhury | H04L 41/12 370/255 |
| 2016/0173371 | A1* | 6/2016 | Bays | H04L 45/42 370/389 |
| 2018/0097908 | A1* | 4/2018 | Ayyagari | H04L 67/2852 |

* cited by examiner

*Primary Examiner* — Mohammad S Adhami
(74) *Attorney, Agent, or Firm* — IP Spring (57) ABSTRACT

Implementations generally relate to data transmission in networks. In some implementations, a method includes determining communication paths in a network, where the communication paths connect a plurality of network nodes, and where the network nodes include one or more edge devices and one or more core devices. The method further includes determining if a forwarding information base (FIB) is permitted at at least one network node. The method further includes filtering one or more packets at the at least one network node if the FIB is not permitted. The method further includes enabling traffic flow of one or more packets at the at least one network node if the FIB is permitted.

17 Claims, 4 Drawing Sheets

SELECTIVE DATA TRANSMISSION IN NETWORKS

BACKGROUND

Communication networks are widely used to provide communication between different computer systems and other electronic devices. Internet protocol (IP) packets can be sent from a device to a single recipient on a network using unicast transmission, or to a group of recipients on a network using multicast transmission. Multicast-based devices use special address assignments for simultaneously broadcasting IP packets to a large audience of users. Filter rules are typically used at layer 3 of a network in the forwarding plane or data plane.

SUMMARY

Implementations generally relate to data transmission in networks. In some implementations, a method includes determining communication paths in a network, where the communication paths connect a plurality of network nodes, and where the network nodes include one or more edge devices and one or more core devices. The method further includes determining if a forwarding information base (FIB) is permitted at at least one network node. The method further includes filtering one or more packets at the at least one network node if the FIB is not permitted. The method further includes enabling traffic flow of one or more of the packets at the at least one network node if the FIB is permitted.

With further regard to the method, in some implementations, the determining of the communication paths is based on shortest path bridging. In some implementations, the determining if the FIB is permitted is based on one or more access policies. In some implementations, the determining if the FIB is permitted is based on one or more access policies, and wherein one or more of the access polices are unicast protocol access policies. In some implementations, the determining if the FIB is permitted is based on one or more access policies, and wherein one or more of the access polices restrict communication between at least two different network nodes. In some implementations, the filtering includes determining that the FIB is not permitted, and dropping one or more of the packets in response to determining that the FIB is not permitted. In some implementations, if the FIB is permitted, the method further includes downloading the FIB and enabling traffic flow of one or more of the packets using the downloaded FIB.

In some embodiments, a computer-readable storage medium carries one or more sequences of instructions thereon. When executed by one or more processors, the instructions cause the one or more processors to perform operations including: determining communication paths in a network, where the communication paths connect a plurality of network nodes, and where the network nodes include one or more edge devices and one or more core devices; determining if a forwarding information base (FIB) is permitted at at least one network node; filtering one or more packets at the at least one network node if the FIB is not permitted; and enabling traffic flow of one or more packets at the at least one network node if the FIB is permitted.

With further regard to the computer-readable storage medium, in some implementations, the determining of the communication paths is based on shortest path bridging. In some implementations, the determining if the FIB is permitted is based on one or more access policies. In some implementations, the determining if the FIB is permitted is based on one or more access policies, and wherein one or more of the access polices are unicast protocol access policies. In some implementations, the determining if the FIB is permitted is based on one or more access policies, and where one or more of the access polices restrict communication between at least two different network nodes. In some implementations, to filter the one or more packets, the instructions further cause the one or more processors to perform operations determining that the FIB is not permitted, and dropping one or more of the packets in response to determining that the FIB is not permitted. In some implementations, if the FIB is permitted, the computer-readable storage medium further includes instructions for downloading the FIB and enabling traffic flow of one or more of the packets using the downloaded FIB.

In some implementations, a system includes one or more processors, and includes logic encoded in one or more non-transitory computer-readable storage media for execution by the one or more processors. When executed, the logic is operable to perform operations including determining communication paths in a network, where the communication paths connect a plurality of network nodes, and where the network nodes include one or more edge devices and one or more core devices; determining if a forwarding information base (FIB) is permitted at at least one network node; filtering one or more packets at the at least one network node if the FIB is not permitted; and enabling traffic flow of one or more packets at the at least one network node if the FIB is permitted.

With further regard to the system, in some implementations, the determining of the communication paths is based on shortest path bridging. In some implementations, the determining if the FIB is permitted is based on one or more access policies. In some implementations, the determining if the FIB is permitted is based on one or more access policies, and where one or more of the access polices are unicast protocol access policies. In some implementations, the determining if the FIB is permitted is based on one or more access policies, and where one or more of the access polices restrict communication between at least two different network nodes. In some implementations, to filter the one or more packets, the logic when executed is further operable to perform operations including determining that the FIB is not permitted, and dropping one or more of the packets in response to determining that the FIB is not permitted.

A further understanding of the nature and the advantages of particular implementations disclosed herein may be realized by reference of the remaining portions of the specification and the attached drawings.

DETAILED DESCRIPTION

Implementations described herein relate to selective data transmission in networks. Implementations facilitate and control communication on a network path at layer 2 of a network by filtering data at the forwarding information base (FIB) based on whether the data is permitted at the network node. Implementations control information flow by controlling FIB downloads at one or more network nodes, including edge devices and core devices. Implementations enable data packets to be transmitted (e.g., sent, forwarded, or received) or restricted based on policies applied at the network nodes.

In some implementations, a system determines communication paths in a network where the communication paths connect multiple network nodes, and where the network nodes include one or more edge devices and one or more core devices. The system also determines if a FIB is permitted at the network node, filters one or more of the packets at the network node if the FIB is not permitted, and enabling traffic flow of one or more of the packets at the network node if the FIB is permitted. In various implementations, the transmission of packets is controlled at the control plane level by selectively deciding not to download certain FIB records from control plane to the data plane, and thus eliminates the need to use filter rules in the data plane, which makes for a more scalable solution.

Figure 1:
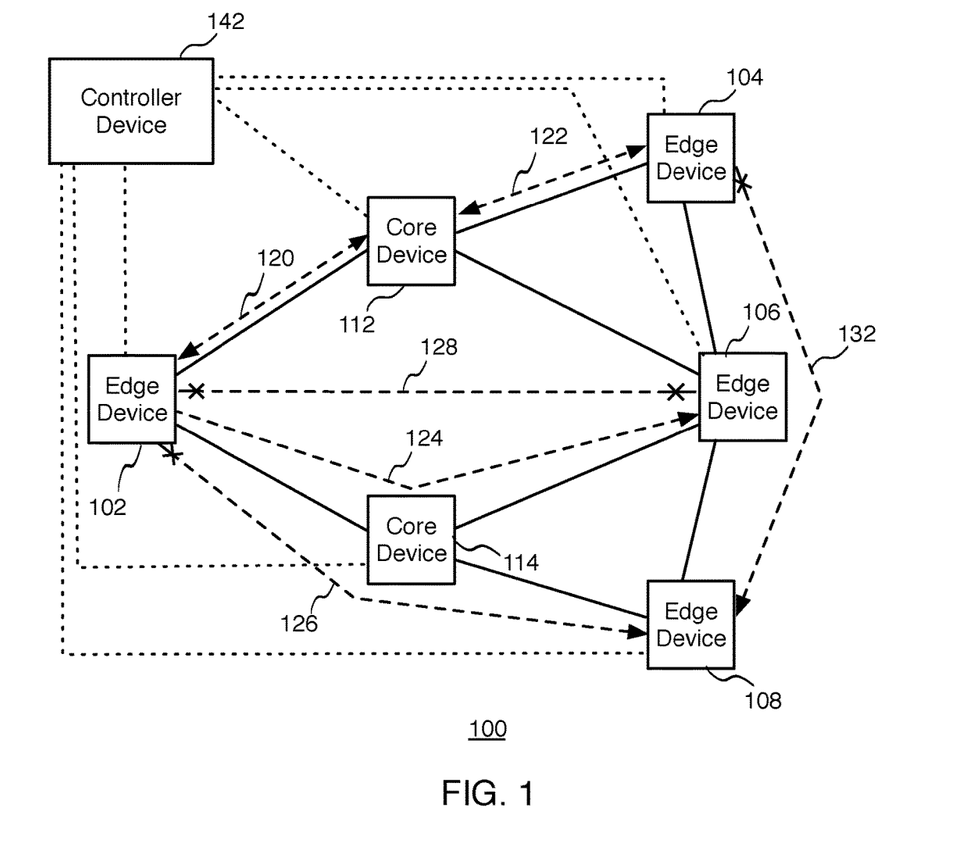
FIG. 1 illustrates a block diagram depicting an example network environment, according to some implementations.

FIG. 1 is a block diagram of an example network system 100, according to some implementations. As shown, network system 100 includes edge devices 102, 104, 106, and 108. As described in more detail herein, edge devices 102, 104, 106, and 108 transmit information based on a unicast protocol. In some implementations, edge devices 102, 104, 106, and 108 may be hardware (HW) virtual extensible local area network (VXLAN) tunnel endpoints (TEPs). In various implementations, edge devices 102, 104, 106, and 108 may transmit packets using unicast and multicast protocols.

Network system 100 also includes core devices 112 and 114. As described in more detail herein, core devices 112 and 114 transmit information based on a unicast protocol and a multicast protocol. In some implementations, multicast routing protocols such as protocol independent multicast (PIM) may operate in an overlay mode with an underlying unicast routing protocol such as open shortest path first (OSPF). The unicast protocol and the multicast protocol may also be referred to as unicast protocol and multicast protocol layers, respectively. As described in more detail herein, implementations enable multicast data to be sent using unicast protocols, thereby eliminating the need for the multicast layer.

In various implementations, the topology of network environment 100 enables direct communication to be made in any direction by way of a unicast protocol and/or a multicast protocol. As described in more detail herein, the topology allows direct communication made in any direction based on various access policies, which may control and/or restrict communication between two or more different network nodes.

Various implementations described herein may be integrated with SDN controller software of a controller device 142 in order to programmatically apply policies described herein. As such, controller device 142 may manage flow control based on protocols in order to enable intelligent networking and direct the flow of network packets. In some implementations, controller device 142 may be a software-defined networking (SDN) controller device. In various implementations, controller device 142 may function to manage, control, and/or configure edge devices 102, 104, 106, and 108, core devices 112 and 114, and/or other network devices or structures connected to the network system 100.

Software applications stored in memories or computer-readable storage mediums of the devices described in FIG. 1 provide instructions that enable respective processors to perform functions described herein.

Although some implementations are described herein in the context of four edge devices and two core devices, one of ordinary skill in the art will readily recognize that there may be any number of edge devices and core devices. In various implementations, network system 100 may not have all of the components shown and/or may have other elements including other types of components instead of, or in addition to, those shown herein.

In various implementations, edge devices 102, 104, 106, and 108 may be wireless access points that enable wireless-capable devices to connect to network system 100 and communicate with devices that are part of network system 100 and with each other. Edge devices 102, 104, 106, and 108 may transmit and receive wireless communication signals between sender and receiver clients via one or more wireless protocols. In various implementations, edge devices 102, 104, 106, and 108 provide entry points into network system 100. For example, edge devices 102, 104, 106, and 108 may connect client devices such as smartphones, tablets, computers (e.g., laptops, desktops, etc. to network system 100. In various implementations, edge devices 102, 104, 106, and 108 may include routers, routing switches, and other network devices. Some examples of suitable wireless protocols include those protocols defined under IEEE 802.11, such as multicast and unicast protocols. Other protocols may also be used such as Internet group management protocol (IGMP) and protocol-independent multicast (PIM).

In various implementations, client devices are operated by users and communicate with other client devices as well as other devices via network system 100. The client devices may include wireless transmitters and receivers (e.g., transceivers, or radios) that allow them to communicate signals wirelessly with other devices that also have this capability. Each client device may be any of a variety of types of devices. For example, in some implementations, client devices may be implemented as cameras, or any other electronic devices that transmit data. Client devices also may be implemented as desktop computers, laptop computers, tablet computers, portable devices, cell phones, media players, wearable devices (e.g., glasses device, wristwatch device, etc.), entertainment devices (television, disc player, stereo), mainframe computer, peripherals (printer, scanner, sensors), or other electronic devices.

In various implementations, network system 100 may include any type of network that connects devices, such as a local area network (LAN), wide area network (WAN), wireless LAN (WLAN), or others types of networks. Any one or more networking standards may be used for network system 100, such as Ethernet, common wireless networking standards, etc.

Any of a variety of different wireless network topologies, devices, and functions may be used. For example, in some implementations, multiple virtual local area networks (VLANs) can be provided, which provide partitions for client devices connected to network system 100 into distinct domains that are isolated from each other. Some implementations can provide communication between VLANs using mobility switches. For example, edge devices 102, 104, 106, and 108 may be connected (e.g., via wired connection such as Ethernet or wirelessly) to core devices 112 and 114, which may implement mobility tunnels. In various implementations, core devices 112 and 114 are core/backbone network devices that provides network between different sub-networks, including edge devices 102, 104, 106, and 108.

Mobility tunnels allow client devices to communicate via particular VLANs associated with particular edge devices 102, 104, 106, and 108 with which the client devices are communicating. Various implementations can include different kinds of switches, hubs, routers, and other types of network devices in the network system 100.

Figure 2:
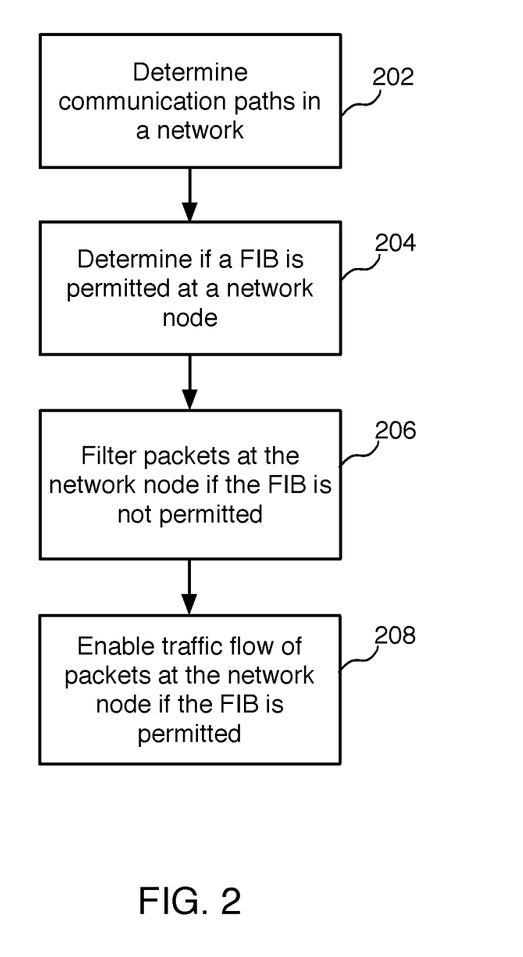
FIG. 2 illustrates an example flow diagram for transmitting messages in networks, according to some implementations.

FIG. 2 illustrates an example flow diagram for transmitting messages, according to some implementations. As described in more detail herein, implementations control traffic flow and may restrict traffic flow at one or more network nodes by applying access policies at the control plane. Each network node sends, forwards, or receives packets based on access policies. Various implementations of the flow diagram for transmitting messages are performed by each network node.

In various implementations, referring to both FIGS. 1 and 2, a method is initiated in block 202, where a system (e.g., a network node) determines communication paths in a network, where the communication paths connect network nodes. In various implementations, the network nodes may include one or more edge devices and one or more core devices such as edge devices 102, 104, 106, and 108, and core devices 112 and 114. As indicated herein one or more of the network nodes may perform implementations associated with the flow diagram of FIG. 2.

In some implementations, shortest path bridging techniques may be run on an intermediate system-to-intermediate system (IS-IS) link state database, where paths are computed for a shortest path bridging MAC (SPBM) and network nodes such as core devices. As such, in various implementations, the system determines the communication paths based on shortest path bridging. In some implementations, shortest path techniques may be run on an IS-IS link state database, where paths may be computed for an SPBM source and destination backbone MAC (BMAC). In some implementations, the IS-IS link state database stores multiple network topologies. Such network topologies may be used to determine the shortest path to a particular destination.

In block 204, the system of a particular network node determines if a forwarding information base (FIB) is permitted at the network node. In some implementations, a user/administrator may configure the FIB permissions. In some implementations, FIB permissions for a particular network node or for particular packets may be stored in any suitable memory location. In various implementations, the terms FIB and FIB record are used interchangeably. In various implementations, the FIB is used to direct packet flow in a network. In some implementations, the FIB may determine where packets are to be forwarded by mapping MAC addresses to ports. The FIB may also be referred to as a forwarding table or MAC table.

In various implementations, policy information may be stored in a database of the control plane. In various implementations, the control plane is at layer 2 of the network and uses the FIB to define the flow of packets in a network. For example, the system may consult an L2 access policies database to check if the FIB is permitted. In various implementations, the system of each network node consults the DB, and downloads the FIB or does not download the FIB based on one or more access policies. In various implementations, one or more access policies determines if the FIB is permitted for a given network node. As described in more detail herein, in various implementations, policies are determined and applied at the database level at the layer 2 control plane.

In various implementations, the system determines if the FIB is permitted based on one or more access policies. In some implementations, one or more access policies may be unicast protocol access policies. In some implementations, one or more access policies may be multicast protocol access policies. In various implementations, the control and decision making with regard to the application of policies resides in the SPB-ISIS control plane code (layer 2 control plane). As such, there is no need to use any filter rules in the forwarding application-specific integrated circuit (ASIC). Various implementations of access policies are described in more detail herein.

In block 206, the system filters one or more packets at the network node if the FIB is not permitted. In some implementations, the filtering includes discarding packets (e.g., dropping packets, etc.). In some implementations, access polices may control and/or restrict communication between at least two different network nodes. As described in more detail herein, access policies may deny packets to flow from or to particular network nodes by not allowing the FIB records to be downloaded to the data path on particular network nodes based on the policy applied.

In some implementations, as a part of the filtering processing, if the system determines that the FIB is not permitted, the system may allow one or more packets to drop based on one or more policies. As a result of packets being dropped, the packets are not forwarded to a destination (e.g., as specified in the packet header). Packets may drop at any give network node (e.g., an edge device or a core device). In some implementations, packets may be dropped at the data plane based on layer 2 header fields (e.g., VLAN, MAC, ISID, etc.). In some implementations, source and destination nodes are not notified of dropped packets. Instead, drop counters may be used and incremented at the network node whenever packets get dropped due to polices.

In block 208, the system enables traffic flow of one or more packets at the network node if the FIB is permitted. Conversely, access policies may allow or permit packets to flow from particular network nodes or flow to particular network nodes. In some implementations, when the FIB is permitted, and to enable traffic flow, the FIB is downloaded from the control plane to the data plane or data path and the packets are forwarded using the downloaded FIB. In some implementations, the FIB may be stored and transmitted/downloaded in a data file.

In various implementations, the data plane is at layer 3 of the network (e.g., packet flow within and edge device (e.g., edge devices 102, 104, 106, 108, etc.) or within a core device (e.g., core devices 112, 114, etc.). The data plane may be referred to as the forwarding plane. In various implementations, the FIB if permitted is downloaded to the data plane/data path of the network node. As indicated herein, in various implementations, the transmission of packets is controlled at the control plane level (layer 2) rather than the data plane level (layer 3) eliminates the need to use filter rules in the data plane.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Referring to FIG. 1, policies may be applied at various different network nodes in order to control traffic originating at particular network nodes, being forwarded by particular network nodes, and being received by particular network nodes.

In various implementations, a policy may control a FIB record download for individual source network nodes, individual destination network nodes, service instance identifier (ISID), etc. As indicated herein, in various implementations, the terms FIB record and FIB may be used interchangeably. Various implementations enable controlled FIB downloads on for all services from a given network node, aggregation level (per node), per node per B-VLAN, as well as at a granular level on a per service level (e.g., ISID level).

In some implementations, a policy may control a FIB record download for aggregate conditions such as for all services from a particular network node. For example, a policy may allow traffic to be sent or received from a particular network node. With reference to core device 112 of FIG. 1, traffic may be sent between core device 112 and edge device 102, as indicated by dashed line 120 with arrows in both directions. Similarly, traffic may be sent between core device 112 and edge device 104, as indicated by dashed line 122 with arrows in both directions.

In some implementations, a policy may control a FIB record download for a particular network node to prevent all traffic that is transmitting from that particular network node to another particular network node. This may prevent all traffic that is being transmitted to that particular network node from another particular network node, by controlling the unicast backbone MAC (BMAC) records that are downloaded. For example, with reference to edge device 106, a policy may restrict any traffic being originated or received from edge device 102 as indicated by dashed line 128 with "X"s at each end. In this example, the policy may also restrict traffic being sent to edge device 102 as indicated by dashed line 128 with "X"s at each end. The policy may allow edge device 106 to send or receive traffic from any other network node. For example, the policy may allow edge device 106 to forward traffic between edge devices 104 and 108.

In some implementations, a policy may control a FIB record download at a granular level for on a per network node basis (e.g., per ISID basis). For example, a particular FIB such as a multicast BMAC for a given network node or ISID may be prevented from being downloaded. For example, with reference to edge device 108, a policy may restrict any multicast traffic being originated or received from edge device 104 as indicated by dashed line 132 with the arrow going in the direction of edge device 108 and with an "X" at the end closest to edge device 104.

In some implementations, a policy may control a FIB record download for a particular originating network node, and the policy may be applied to multiple network nodes in order to control forwarding of packets from the originating network node along multiple possible paths. For example, with reference to edge device 102, a policy may allow any traffic being originated at edge device 102 to be forwarded to edge device 106, as indicated by dashed line 124 with the arrow going in the direction of edge device 106. In this example, the policy may be applied at multiple network nodes such as core device 114 and edge device 106. Also, in this example, the policy may restrict any traffic being originated at edge device 102 from being forwarded to edge device 108, as indicated by dashed line 126 with the arrow going in the direction of edge device 108 and with an "X" at the end closest to edge device 102. In this example, the policy may be applied at multiple network nodes such as core device 114 and edge device 106. As such, neither core device 114 nor edge device 106 will forward packets originating at edge device 102 to edge device 108.

Other policies are possible. For example, in some implementations, a policy may control a FIB record download for entire service like multicast over SPB service. For example, the system may prevent the multicast over SPB BMAC SA record from being downloaded. The particular policies applied at a given network node may vary and will depend on the particular implementation.

While implementations have been described herein in the context of the network topography of FIG. 1, any variety of different network topologies, devices, and functions may be used. Further example implementations are described in more detail herein.

Figure 3:
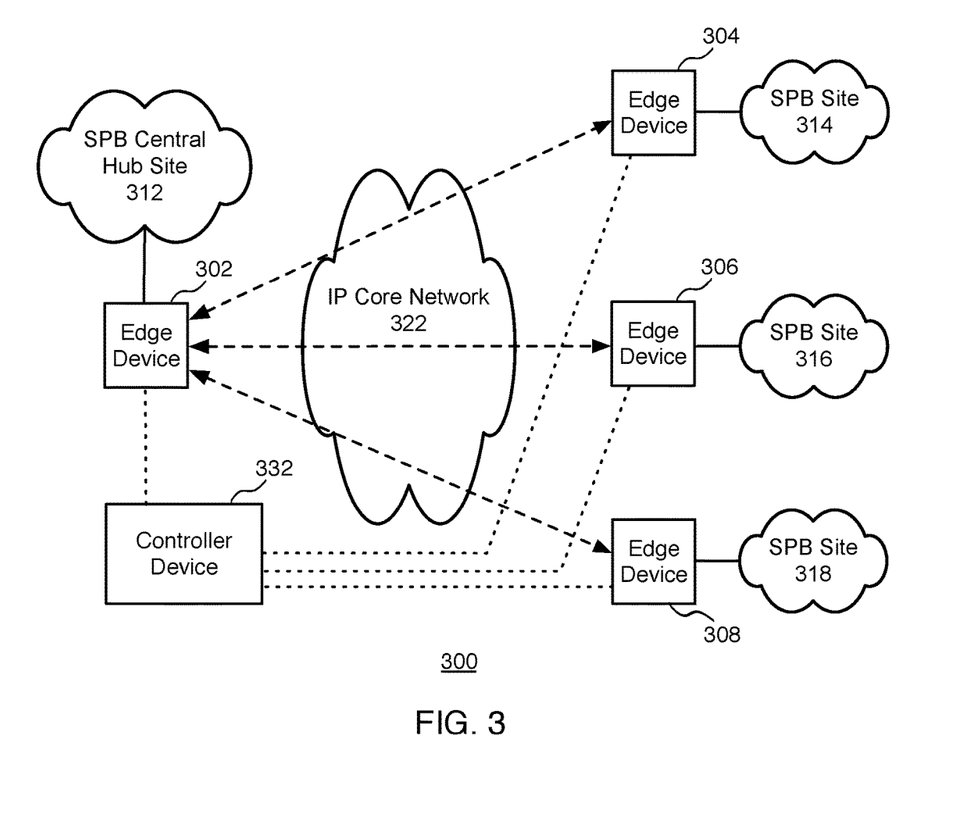
FIG. 3 illustrates a block diagram depicting an example network environment, according to some implementations.

FIG. 3 illustrates a block diagram depicting an example network environment 300, according to some implementations. Shown are edge devices 302, 304, 306, and 308. Edge device 302 is an edge device associated with SPB central hub site 312. Edge devices 304, 306, and 308 are edge devices associated with respective SBP sites 314, 316, and 318.

The topology of network environment 300 enables edge devices 304, 306, and 308 to communicate with each other via edge device 302 through IP core network 322. When applied in the context of hub and spoke topology, implementations described herein may be extended to block traffic from all edge devices belonging to a particular site/branch.

In various implementations, access policies are applied at the hub site 312, more particularly at edge device 302 in order to control or restrict communication between different network nodes such as edge devices 304, 306, and 308. Also shown is a controller device 332 that manages edge devices 302, 304, 306, and 308. In some implementations, SPB site 316 is permitted to send traffic (e.g., layer 2 virtual service network/IP shortcuts/layer 3 virtual service network traffic) to SPB central hub site 312 but not permitted to send traffic (e.g., multicast over SPB) traffic to other sites. SPB site 318 is permitted to send traffic for all SPB services including multicast over SPB traffic. In various implementations, traffic always sent to other SPB sites through SPB central hub site.

In some implementations, each of the SPB sites 314, 316, and 318 identified by a particular identifier (e.g., logical interface IDs) is in the control plane. In some implementations, SPBM-ISIS control plane does not download unicast or multicast FIB records for disabled services on SPB central hub site 312 based on the system ID of a remote edge node over which IS-IS logical interface tunnel is established.

Implementations provide various benefits. For example, implementations eliminate the need or use for hardware filter rules in the forwarding ASIC which are limited in number. Implementations provide a scalable solution. Implementations are useful in debugging scenarios. For example, traffic from a particular network node such as a particular edge device may be blocked if that network node is being flooded with traffic.

Figure 4:
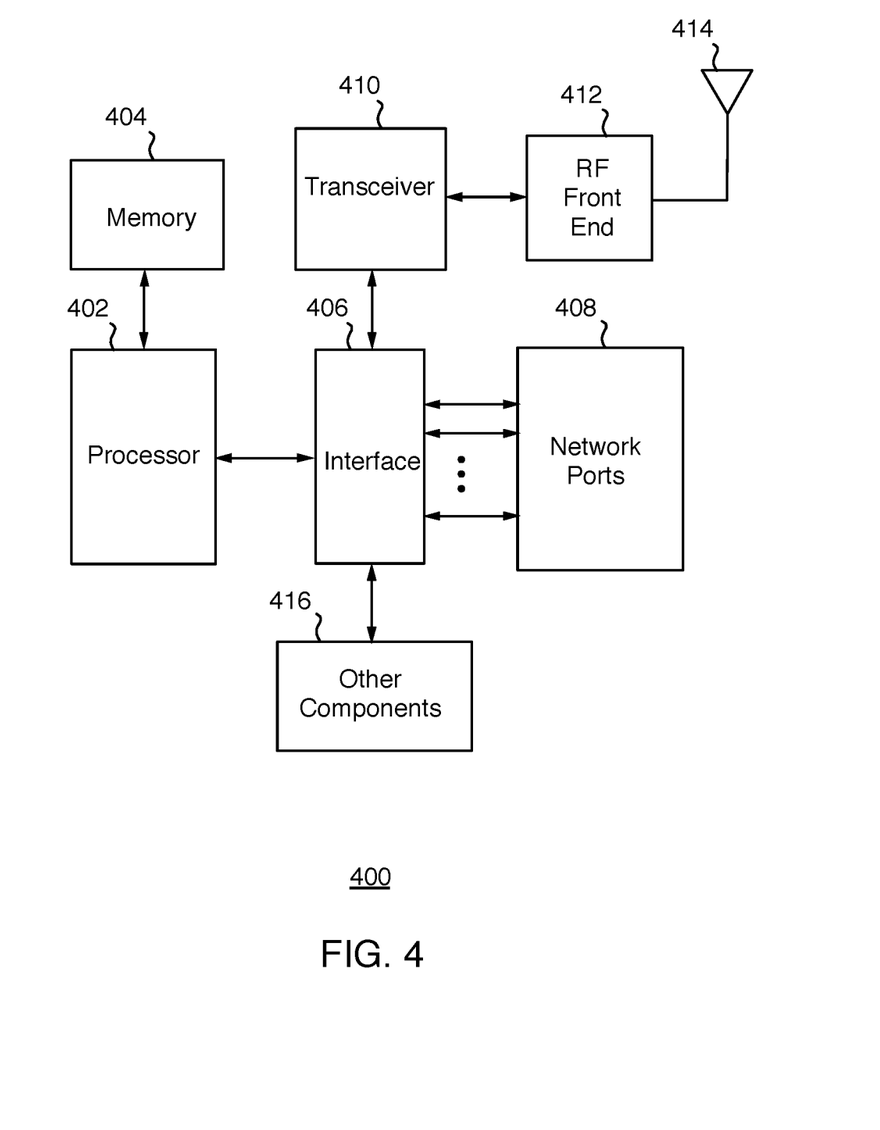
FIG. 4 illustrates a block diagram of an example device, according to some implementations.

FIG. 4 illustrates a block diagram of an example device 400, according to some implementations. Device 400 may be used for various implementations described herein. Device 400 may be, for example, a wireless controller such a controller device 102 as shown in the example of FIG. 1, or other type of network device such as sender devices 112 and 116, receiver devices 114 and 118, edge devices 122, 124, 126, and 128, and core devices 132, 134, 136, and 138, etc. In an example configuration, device 400 includes a processor 402 and a memory 404.

Depending on the desired configuration, processor 402 may be of any type of processing circuitry including but not limited to one or more microprocessors, microcontrollers, digital signal processors (DSPs), application specific integrated circuits (ASICs), or any combination thereof. In some examples, processor 402 may include one or more levels of caching, a processor core, and registers. An example processor core may include an arithmetic logic unit (ALU), a floating-point unit (FPU), a digital signal processing (DSP) core, or any combination thereof. A memory controller can also be used with processor 402, or, in some implementations, a memory controller can be an internal part of processor 402.

Memory 404 may store data used in the operation of the device 400. For example, an example implementation, device 400 may be a controller device, and system memory 404 may store an operating system for the controller device, one or more applications for the controller device, and program data. In some implementations, memory 404 may store software operative to perform network device functionality as well as read the instructions sent by an administrator or other user to the device and perform other functions as described above, including reading and executing commands and parameters, receiving information from associated wireless access points, and performing blocks of methods described herein using one or more processors. For example, edge device profiles providing configurations for edge devices, and/or software images and/or parameters for sending to be installed on edge devices may be stored in memory 404. Furthermore, a signal coverage map can be stored in memory 404 representing the wireless coverage of associated edge devices in the network. Alternatively, the software may be implemented as hardware or a combination of hardware and software. Memory 404 may be implemented as one or more of various types, volatile and/or non-volatile, including random access memory (RAM), read-only memory (ROM), electrically erasable programmable read-only memory (EEPROM), flash memory or other memory technology, etc.

An interface 406 may be used to interface processor 402 with other functional components of the device 400. Such other components may include network ports 408 of device 400, where network ports 408 are connected to other devices on the network to enable communication of data to and from other network devices. For example, Ethernet, universal serial bus (USB), or other types of ports may allow wired network communication to device 400.

A transceiver 410 may be connected to interface 406 to enable transmission and reception of wireless signals at device 400. For example, a radio frequency (RF) front end 412 and an antenna 414 may enable transmission and reception of wireless RF signals, as well as conversion between analog signals used in wireless communication and digital signals used by device 400. Signals of other frequencies may be communicated in other implementations.

Other components 416 may also be connected to interface 406. For example, storage devices may be connected to interface 406, such as a compact disc ROM (CD-ROM), digital video disc (DVD), or other optical storage, magnetic tape storage, magnetic disk storage or other magnetic storage devices, solid state memory storage, or any other medium which can be used to store the desired information and which can be accessed by device 400. Any such computer storage media (including memory 404) may be part of or accessible by device 400. Example computer storage media can include volatile and nonvolatile, removable and non-removable media implemented in any method or technology for storage of information, such as computer readable instructions, data structures, program modules, or other data.

In various implementations, device 400 may not have all of the components shown and/or may have other elements including other types of components instead of, or in addition to, those shown herein.

Although the description has been described with respect to particular embodiments thereof, these particular embodiments are merely illustrative, and not restrictive. Concepts illustrated in the examples may be applied to other examples and embodiments.

Note that the functional blocks, methods, devices, and systems described in the present disclosure may be integrated or divided into different combinations of systems, devices, and functional blocks as would be known to those skilled in the art.

In general, it should be understood that the circuits described herein may be implemented in hardware using integrated circuit development technologies, or via some other methods, or the combination of hardware and software that could be ordered, parameterized, and connected in a software environment to implement different functions described herein. For example, the embodiments may be implemented using a general purpose or dedicated processor running a software application through volatile or non-volatile memory. Also, the hardware elements may communicate using electrical signals, with states of the electrical signals representing different data. It should be further understood that this and other arrangements described herein are for the purposes of example only. As such, those skilled in the art will appreciate that other arrangements and other elements (e.g., machines, interfaces, functions, orderings, and groupings of functions, etc.) may be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural terms and/or singular term herein, those having ordinary skill in the art can translate from the plural to the singular and/or from the singular to the plural as is appropriate to the context and/or application. The various singular/plural permutations may be expressly set forth herein for sake of clarity.

It will be understood by those skilled in the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those skilled in the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those of ordinary skill in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense that one having ordinary skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Any suitable programming language may be used to implement the routines of particular embodiments including C, C++, Java, assembly language, etc. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

Particular embodiments may be implemented in a computer-readable storage medium (also referred to as a machine-readable storage medium) for use by or in connection with an instruction execution system, apparatus, or device. Particular embodiments may be implemented in the form of control logic in software or hardware or a combination of both. The control logic, when executed by one or more processors, may be operable to perform that which is described in particular embodiments.

A "processor" includes any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real time," "offline," in a "batch mode," etc. Portions of processing may be performed at different times and at different locations, by different (or the same) processing systems. A computer may be any processor in communication with a memory. The memory may be any suitable non-transitory processor-readable storage medium, such as random-access memory (RAM), read-only memory (ROM), magnetic or optical disk, or other tangible media suitable for storing instructions for execution by the processor.

Particular embodiments may be implemented by using a programmable general purpose digital computer, by using application specific integrated circuits, programmable logic devices, field programmable gate arrays, optical, chemical, biological, quantum or nanoengineered systems, components and mechanisms. In general, the functions of particular embodiments may be achieved by any means known in the art. Distributed, networked systems, components, and/or circuits may be used. Communication, or transfer, of data may be wired, wireless, or by any other means.

It will also be appreciated that one or more of the elements depicted in the drawings/figures may also be implemented in a more separated or integrated manner, or even removed or rendered as inoperable in certain cases, as is useful in accordance with a particular application. It is also within the spirit and scope to implement a program or code that is stored in a machine-readable medium to permit a computer to perform any of the methods described above.

While one or more implementations have been described by way of example and in terms of the specific embodiments, it is to be understood that the implementations are not limited to the disclosed embodiments. To the contrary, it is intended to cover various modifications and similar arrangements as would be apparent to those skilled in the art.

Therefore, the scope of the appended claims should be accorded the broadest interpretation so as to encompass all such modifications and similar arrangements.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A computer-implemented method comprising:
   determining communication paths in a network, wherein the communication paths connect a plurality of network nodes, and wherein the network nodes include one or more edge devices and one or more core devices;
   determining if a forwarding information base (FIB) is permitted at at least one network node based on one or more access policies;
   denying packet flow by not allowing FIB records to be downloaded based on the one or more access policies;
   filtering, at a control plane, one or more packets at the at least one network node if the FIB is not permitted, wherein the filtering of the one or more packets comprises dropping the one or more packets before reaching a data plane, and wherein the filtering of the one or more packets eliminates a need to use filter rules in the data plane for the one or more packets: and
   enabling traffic flow of one or more of the packets at the at least one network node if the FIB is permitted.

2. The method of claim 1, wherein the determining of the communication paths is based on shortest path bridging.

3. The method of claim 1, wherein the determining if the FIB is permitted is based on one or more access policies, and wherein one or more of the access polices are unicast protocol access policies.

4. The method of claim 1, wherein the determining if the FIB is permitted is based on one or more access policies, and wherein one or more of the access polices restrict communication between at least two different network nodes.

5. The method of claim 1, wherein the filtering comprises:
   determining that the FIB is not permitted; and
   dropping one or more of the packets in response to determining that the FIB is not permitted.

6. The method of claim 1, wherein, if the FIB is permitted, the method further comprises:
   downloading the FIB; and
   enabling traffic flow of one or more of the packets using the downloaded FIB.

7. A non-transitory computer-readable storage medium with program instructions stored thereon, the instructions when executed by one or more processors cause the one or more processors to perform operations comprising;
   determining communication paths in a network, wherein the communication paths connect a plurality of network nodes, and wherein the network nodes include one or more edge devices and one or more core devices;
   determining if a forwarding information base (FIB) is permitted at at least one network node based on one or more access policies;
   denying packet flow by not allowing FIB records to be downloaded based on the one or more access policies:
   filtering, at a control plane, one or more packets at the at least one network node if the FIB is not permitted, wherein the filtering of the one or more packets comprises dropping the one or more packets before reaching a data plane, and wherein the filtering of the one or more packets eliminates a need to use filter rules in the data plane for the one or more packets for the one or more packets: and
   enabling traffic flow of one or more of the packets at the at least one network node if the FIB is permitted.

8. The computer-readable storage medium of claim 7, wherein the determining of the communication paths is based on shortest path bridging.

9. The computer-readable storage medium of claim 7, wherein the determining if the FIB is permitted is based on one or more access policies, and wherein one or more of the access polices are unicast protocol access policies.

10. The computer-readable storage medium of claim 7, wherein the determining if the FIB is permitted is based on one or more access policies, and wherein one or more of the access polices restrict communication between at least two different network nodes.

11. The computer-readable storage medium of claim 7, wherein, to filter the one or more packets, the instructions further cause the one or more processors to perform operations comprising:
    determining that the FIB is not permitted; and
    dropping one or more of the packets in response to determining that the FIB is not permitted.

12. The computer-readable storage medium of claim 7, wherein, if the FIB is permitted, the instructions further cause the one or more processors to perform operations comprising:
    downloading the FIB; and
    enabling traffic flow of one or more of the packets using the downloaded FIB.

13. A system comprising; one or more processors; and
    logic encoded in one or more non-transitory computer-readable storage media for execution by the one or more processors and when executed operable to perform operations comprising:
    determining communication paths in a network, wherein the communication paths connect a plurality of network nodes, and wherein the network nodes include one or more edge devices and one or more core devices;
    determining if a forwarding information base (FIB) is permitted at at least one network node based on one or more access policies;
    denying packet flow by not allowing FIB records to be downloaded based on the one or more access policies:
    filtering at a control plane, one or more packets at the at least one network node if the FIB is not permitted, wherein the filtering of the one or more packets comprises dropping the one or more packets before reaching a data plane, and wherein the filtering of the one or more packets eliminates a need to use filter rules in the data plane for the one or more packets: and
    enabling traffic flow of one or more of the packets at the at least one network node if the FIB is permitted.

14. The system of claim 13, wherein the determining of the communication paths is based on shortest path bridging.

15. The system of claim 13, wherein the determining if the FIB is permitted is based on one or more access policies, and wherein one or more of the access polices are unicast protocol access policies.

16. The system of claim 13, wherein the determining if the FIB is permitted is based on one or more access policies, and wherein one or more of the access polices restrict communication between at least two different network nodes.

17. The system of claim 13, wherein, to filter the one or more packets, the logic when executed is further operable to perform operations comprising:

determining that the FIB is not permitted; and dropping one or more of the packets in response to determining that the FIB is not permitted.

\* \* \* \* \*